G. C. BAUMAN.
CUTTING, COUNTING, AND PACKAGING MACHINE.
APPLICATION FILED AUG. 15, 1911.

1,134,941.

Patented Apr. 6, 1915.
9 SHEETS—SHEET 1.

Fig. 1

UNITED STATES PATENT OFFICE.

GEORGE C. BAUMAN, OF CHICAGO, ILLINOIS.

CUTTING, COUNTING, AND PACKAGING MACHINE.

1,134,941.  Specification of Letters Patent.  Patented Apr. 6, 1915.

Application filed August 15, 1911. Serial No. 644,258.

*To all whom it may concern:*

Be it known that I, GEORGE C. BAUMAN, a citizen of the United States, and a resident of the city of Chicago, in the county of Cook and State of Illinois, have invented certain new and useful Improvements in Cutting, Counting, and Packaging Machines; and I do hereby declare that the following is a full, clear, and exact description of the same, reference being had to the accompanying drawings, and to the numbers of reference marked thereon, which form a part of this specification.

This invention relates to a cutting, counting and packaging machine, and more particularly to a machine adapted to cut from a sheet, a plurality of duplicate pieces, to count the same, to assemble the same in individual packs corresponding in number, and to discharge the packs from the machine when a predetermined number of cards or the like have been delivered thereto.

It is also an object of the invention to afford a machine of the class described adapted to take the material from a roll of the paper or the like instead of necessitating first severing the same into sheets.

It is also an object of the invention to afford a mechanism whereby the card-board or other material when drawn from a roll, is reversely bent at a point intermediate the roll in the cutting mechanism, thereby tending to straighten the sheet.

It is a further object of the invention to afford a mechanism by means of which the material is fed continuously to reciprocating dies, whereby cutting is effected, said dies in part embracing and including means for severing the selvage strip between adjacent guards to permit the waste material to fall from the machine.

It is also an object of the invention to afford a feeding mechanism whereby the sheet is intermittently advanced into cutting position, and to afford means for regulating the feed for cards of different sizes.

The invention also has for its object the construction by means of which the cards (or other cuttings) are delivered into packs at the rear of each die, and mechanism whereby the completed packs are discharged from the machine or moved from collecting position preparatory to the collection of the next pack.

It is, of course, an important object of the invention to afford a machine capable of taking the stock from a stock roll and adapted to operate at very high speed and to cut many cards simultaneously and for the entire width of the sheet.

It is also an important object of the invention to afford a construction of the utmost simplicity, strength and durability.

The invention embraces many novel features and in a preferred form is hereinafter more fully described and defined in the appended claims.

As shown in the drawings: The machine comprises a suitable frame, the multiple or gang die mounted thereon, the stock roll, and mechanism to feed the stock to the dies, and mechanisms for delivering the cards from the dies for counting and for assembling the same into packs. The frame comprises parallel side frame members 1 and 2, which may be constructed of cast metal or any suitable material, and are rigidly connected at intervals in their length by means of transverse bars or beams 3 and 4, any required number of which may, of course, be used. Mounted upon the side frame members 1 and 2, are the upwardly extending frame members 3ª and 4ª, of the press. These are connected together at their top by means of the transverse beam 5, and journaled at the upper ends of said frame members is the transverse shaft 6, provided near each end thereof and between the side frame members 3ª and 4ª, with cranks 7 and 8. As shown, a bracket 9, is secured centrally on the transverse beam 5, and at its lower side fits on said shaft 6, near the middle thereof to afford a central bearing for said shaft against the pressure exerted in the cutting.

Figure 1:
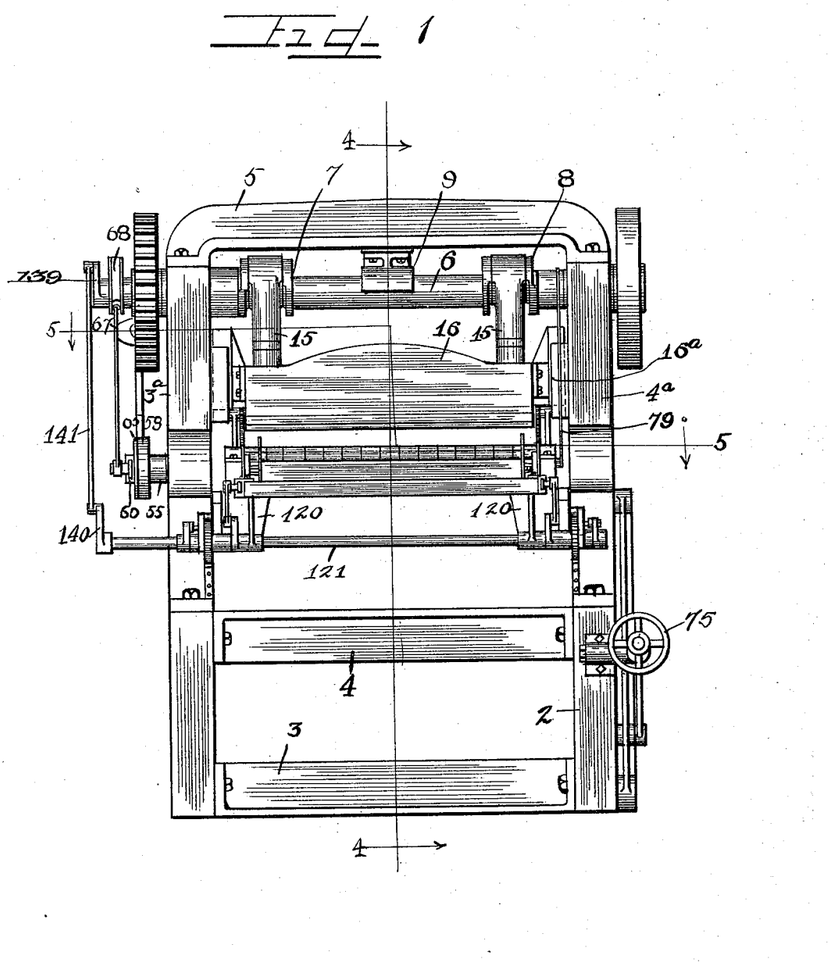
Figure 1 is an end elevation of a machine embodying my invention.
Figure 17:
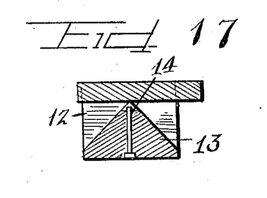
Fig. 17 is a section taken on line 17—17 of Fig. 5, and illustrating the means for cutting the selvage of the sheet.
Figure 18:
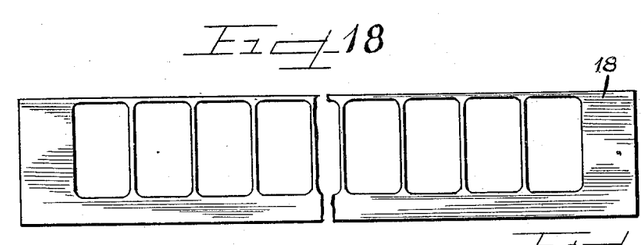
Fig. 18 is a fragmentary bottom plan view of the female member of the die.

Extending transversely between, and rigidly secured to the frame members of the press, and affording a bed for the dies, is a transverse frame member 10, rigidly secured in place, and, as shown, is supported at each end with inwardly directed flanges 11, integral with said frame members. Secured on said transverse frame member or bed piece 10, are the upwardly directed male members 12, of the die, and arranged between the same are upwardly directed V shaped cutters comprising a base 13, and a sharp V shaped cutting point 14, secured thereon, as shown in Fig. 17. Secured on each of the cranks 7 and 8, are connecting rods 15, each pivotally engaged at its lower end near the end of a vertical reciprocating head 16, which extends transversely the machine, as shown in Fig. 1, and moves vertically in the vertical guide-ways 16ª, provided on the end frame members.

Figure 6:
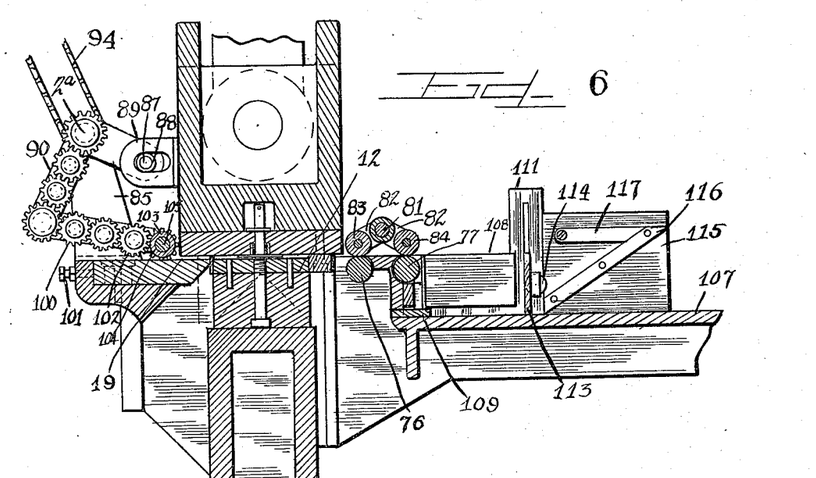
Figs. 6 and 7 are enlarged fragmentary sectional views illustrating the operation of the dies and the mechanism for feeding the cut cards therefrom.
Figure 7:
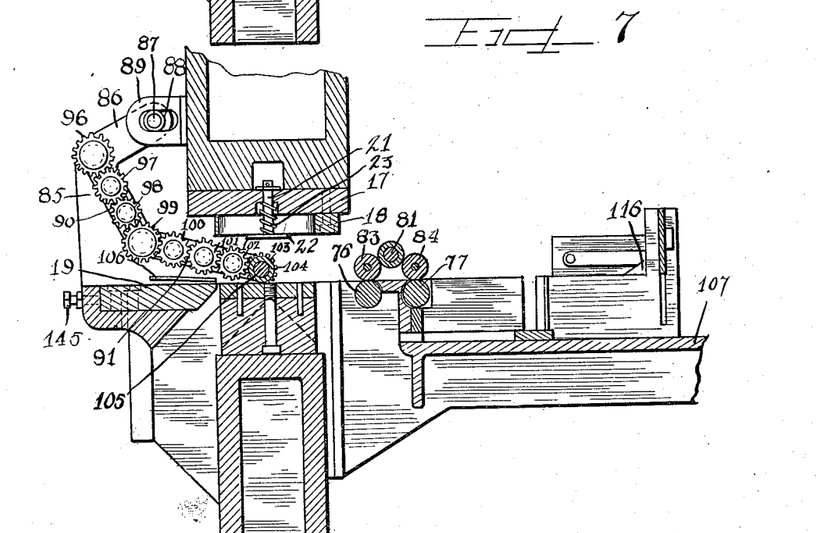

Secured on the lower face of the head 16, is a plate 17, to which is rigidly secured the female die members, in this instance comprising a plate 18, of a length to extend across the machine and having apertures closely arranged therein complemental with the male die members rigidly secured beneath the same. The plate from which the female die members are made is of a high quality of steel and the apertures are so formed as to afford a continuous cutting edge around each of said apertures to coact with the cutting edges of the male die members 12. As shown also, the thin bars or webs between the adjacent apertures in said female die member coact with the sharp cutting point 14, before described, so that as fast as the cards are cut and delivered, the selvage or refuse paper from which the cards were cut, is cut into small pieces and permitted to fall from the machine. Said connecting rods 15, are constructed in a familiar manner to permit adjustment as to length. As shown also, the front and rear edges of the male die plate 12, afford cutting edges and coact with corresponding cutting edges afforded by the corresponding edges of the feed table. In this instance, as shown, a plate 19, is set in the table and extends in close proximity with the male die member affording merely a narrow space therebetween to permit the corresponding edge of the female die plate 18, to pass therebetween, and, as shown, the opposite edge or that directed toward the discharge position from the machine is relatively broad and acts to deflect the selvage edge of the card sheet downwardly below the plane of the table, with each reciprocation of the die. As shown, a stripper is carried for each die in the female die member. For this purpose, a stem 21, is slidably engaged in the plate 17, and at the center of each die, and secured on the lower end thereof is a plate 22, as shown in Figs. 6 and 7, which is normally held outwardly by means of a spring 23, engaged on said stem and sufficiently strong to eject the card or other object cut by the die from the female member simultaneously with the retraction of the die.

Supported upon the opposite end of the frame from the die press or cutting mechanism, is an upwardly directed bracket or standard 24, one on each side of the frame, the upper ends of which are shaped to afford bearings open at the top, in which is journaled the shaft 25, for the roll 26, of stock. As shown also, a key or pin 27, may be inserted, if desired, through said bracket above the shaft 25, to hold the shaft in place, though this is not essential. Mounted on said frame on each side thereof between the press and the stock roll, are upwardly directed standards 28 and 29, and journaled in the standards 28, transversely the machine, are upper and lower feed coacting rolls 30 and 31. Journaled on the standards 29, likewise, are upper and lower feed rolls 32 and 33, of which the feed roll 33, may be of larger diameter than the feed rolls 32. The feed rolls 31, are continuously driven and the feed roll 33, intermittently driven to deliver the stock to the dies.

Figure 2:
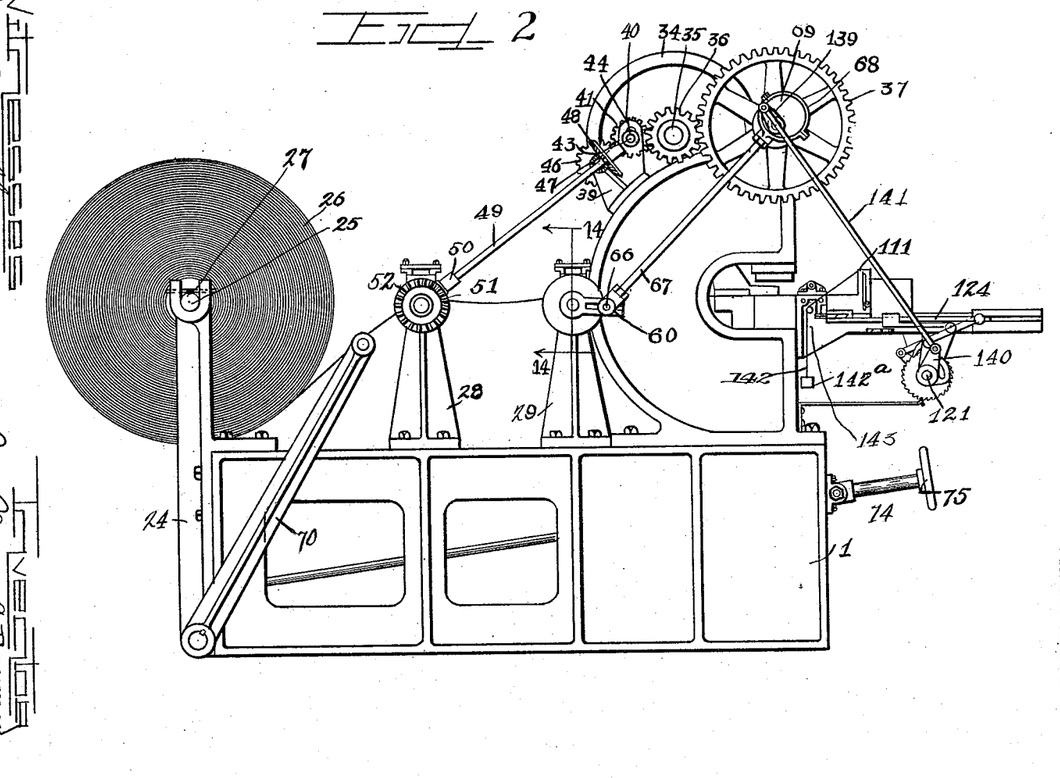
Fig. 2 is a side elevation thereof.
Figure 19:
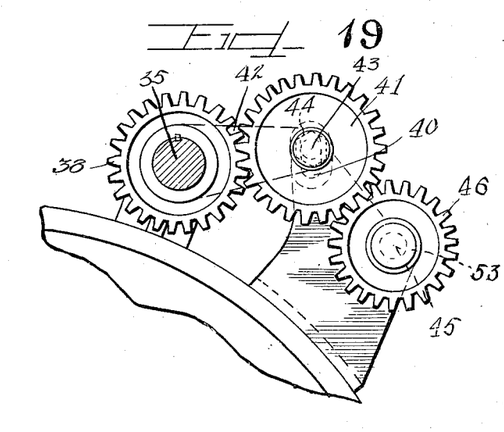
Fig. 19 is an enlarged, fragmentary section illustrating the train for the continuous feed rolls.
Figure 20:
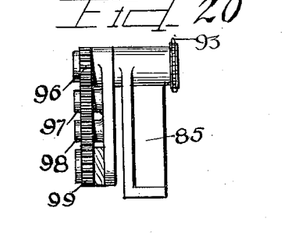
Fig. 20 is an elevation of the gears on the bell crank.

A belt pulley 34, is secured upon a shaft 35, journaled on the side frame members of the press transversely the machine. A pinion 36, is secured on said shaft 35, on the opposite side the machine from the driving pulley 34, and meshes a gear wheel 37, secured on the die shaft 6. Also secured on the driving shaft 35, is a pinion 38, positioned at the inner side of the side frame member 3ª of the press. A bracket 39, is secured on said side frame member adjacent said shaft, and is provided adjacent said pinion with an upwardly extending slot 40, as shown in Figs. 2 and 19, and mounted upon a stud shaft vertically movable in said slot, is a pinion 41, which meshes with the pinion 38. As shown, a link 42, is journaled at one end on the shaft 35, between the pinion 38, and the frame, and at the other end receives the stud shaft 43, therethrough on which the pinion 41, is journaled, thereby serving to hold said pinions at all times in mesh. A clamping nut 44, is secured on said stud shaft 43, on the outer side the bracket, and acts to rigidly clamp the stud shaft in adjusted position. Also extending through and journaled in said bracket, is a shaft 45, provided on its inner end with a pinion 46, which meshes with the pinion 41, and on its outer end with a bevel pinion 47, which meshes with a bevel gear 48, secured on a shaft 49, which extends downwardly and is journaled at its lower end in a bearing 50, secured on the standard 28. Said shaft 49, is provided at its lower end with a bevel pinion 51, which meshes with a bevel gear 52, rigidly secured on the feed roll 31, whereby said feed rolls 30 and 31, are driven continuously. The rate of drive of said feed rolls may be varied by removing the pinion 46, and substituting a larger or a smaller pinion therefor, as desired, this substitution being readily accomplished by the removal of the stud screw 53, whereby the pinion 46, is secured in place, as shown in Fig. 19. Of course, the substitution may necessitate the adjustment of the pinion 41, upwardly or downwardly to bring the same in mesh with the pinion substituted. This, however, is easily accomplished by releasing the clamping nut 44, which permits such adjustment in the slot in said bracket.

Figures 11, 12, 13, 14, 15:
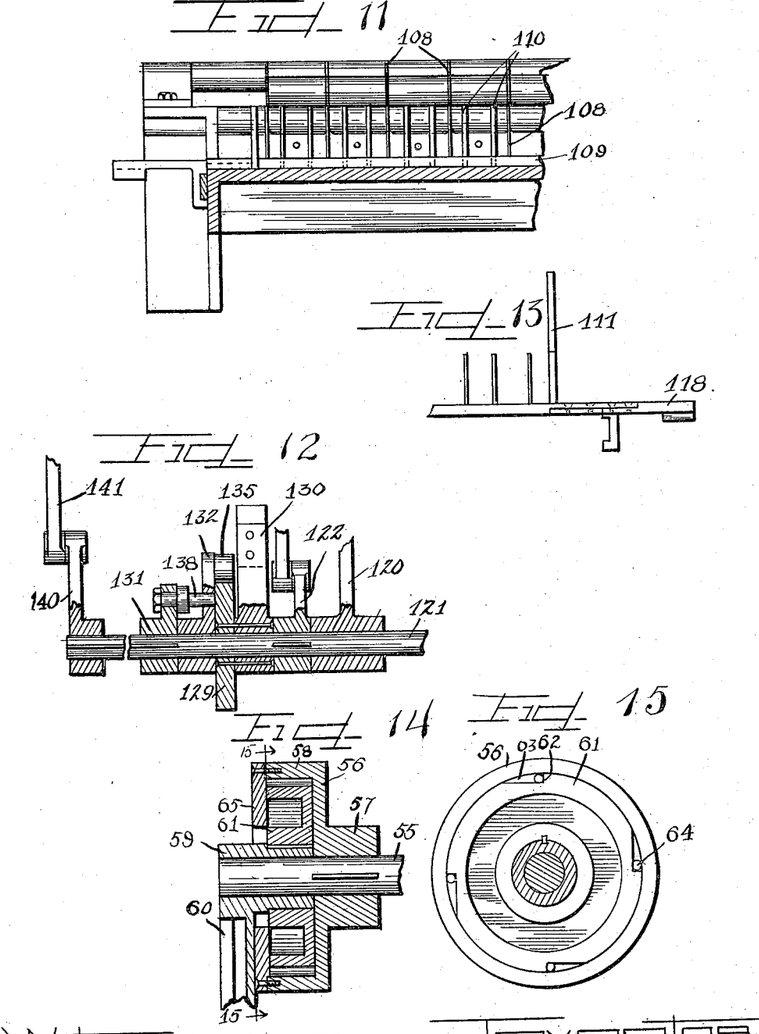
Fig. 11 is a section on line 11—11 of Fig. 8.
Fig. 12 is a section on line 12—12 of Fig. 8.
Fig. 13 is a view in elevation of the pack discharge plate showing the same broken and removed from the machine.
Fig. 14 is a section on line 14—14 of Fig. 2.
Fig. 15 is a section on line 15—15 of Fig. 14.
Figure 16:
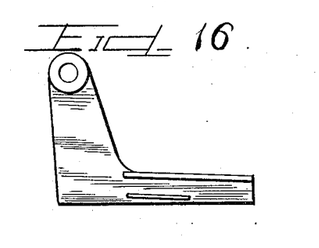
Fig. 16 is an enlarged side elevation of the elevating guide for the card feed.

The feed rolls 32 and 33, are driven intermittently. For this purpose, as shown, a clutch is provided on the outer end of the shaft 55, of the feed roller 33, and rigidly secured thereon at the outer side of the standard 29, is the female member 56, of the clutch, as shown in Figs. 14 and 15. This, as shown, comprises a hub 57, which is keyed to said shaft on which is carried a peripheral rim 58, affording an inner bearing surface. Rotatably secured on the shaft 55, and extending into said female member is the hub 59, of a crank arm 60, and keyed on said hub is a disk or wheel 61, cut in its periphery to afford one or more radial shoulders 62, and oblique faces 63, affording recesses in each of which is provided a roller 64, though obviously a ball may be used, if preferred.

An annular plate 65, is secured to the rim 58, on the outer side thereof, and acts to hold said clutch members in operative relation, as shown in Fig. 14. The crank arm 60, is radially slotted in a familiar manner and adjustably engaged therein and projecting laterally therefrom is a stud 66, on which is journaled one end of an eccentric rod 67, the other end of which is secured on an eccentric strap or yoke 68, which engages an eccentric 69, secured on the die shaft 6, at the outer side of the gear 37. The eccentric and crank arm 60, are so set relatively the die shaft and the throw of the clutch before described is such, that as the die head rises, the feed roller 33, is rotated by means of said clutch to feed the stock inwardly between the dies a distance equal to the width of stock required for the next cutting. With the downward movement of the die, however, movement of the crank 60, is reversed, thereby releasing the clutch and stopping the feed, thus affording an intermediate inward feed of the stock to the dies. The feed, of course, may be varied to correspond with the requirements for various dimensions of the cuttings or cards by shifting the adjustment of the lower end of the eccentric rod with the crank 60, inward adjustment increasing the feed, while outward adjustment decreases the feed of stock.

Figure 3:
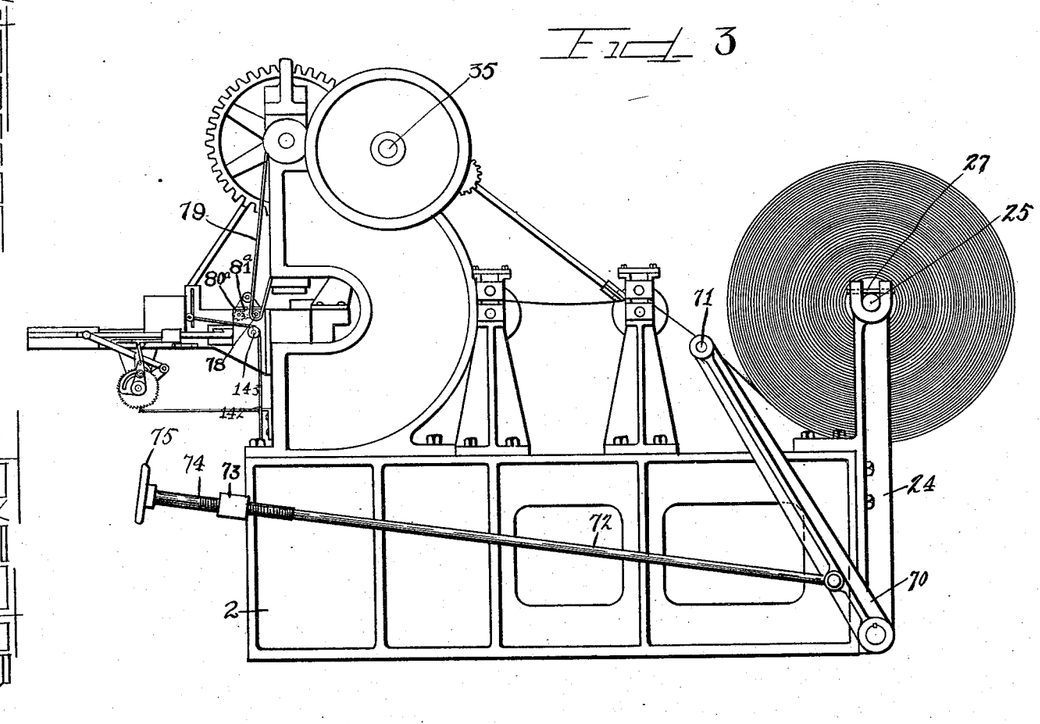
Fig. 3 is a view in elevation of the opposite side from that shown in Fig. 2.

Means are provided also for straightening the paper or stock as delivered from the roll by reversely bending the same. For this purpose, an arm 70 is pivotally engaged at its lower end below the stock roll and conveniently, as shown in Figs. 2 and 3, on the standard or bracket 24, near the lower end thereof. Said arms are connected transversely the machine by means of a shaft 71, over which the paper is drawn from the stock roll by the feed rolls. A rotatable shaft 72, is pivotally engaged on one of said arms intermediate its ends, as shown in Fig. 3, and extends alongside the frame to the operator's position. A nut 73, is journaled on the end of the frame and threaded therethrough is a tubular shaft 74, provided at its outer end with a hand wheel 75, for manual actuation. Said shaft 74, is internally threaded to receive the threaded end of the rod 72. One of said shafts is provided with a right thread and the other with a left thread, so that rotation of the hand wheel 75, acts to adjust said arm forwardly or rearwardly, dependent upon the direction of rotation, thereby bringing the breaking shaft 71, to the required adjustment relatively the stock drawn from the roll to reversely bend and thereby straighten the same, as shown in Figs. 2 and 3.

The cards as cut are delivered from the dies in packs. For this purpose, as shown, rolls 76 and 77, are jornaled transversely the machine and on the opposite side of the cutting dies and stock roll, and with their peripheries projecting slightly above the table. Secured on one end of the roll 76, is a pulley 78, about which is trained a sprocket chain or belt 79, which is trained around the die shaft 6, as shown in Figs. 1 and 3, to continuously rotate said roll. A pinion 80$^a$, is provided on the corresponding end of the roll 77, driven by means of an idle pinion 81$^a$, meshing therewith, and which also meshes with a pinion secured on the roll 76, so that both said rolls are rotated in the same direction continuously. Positioned above said rolls is a transverse shaft 81. Oppositely directed links 82, are provided at each end thereof in the outwardly directed ends of which and above the rolls 76 and 77, are journaled rolls 83 and 84, which rest upon the rolls 76 and 77 respectively, and are continuously driven by said rolls to discharge the cards from the die to the respective packs.

Figure 4:
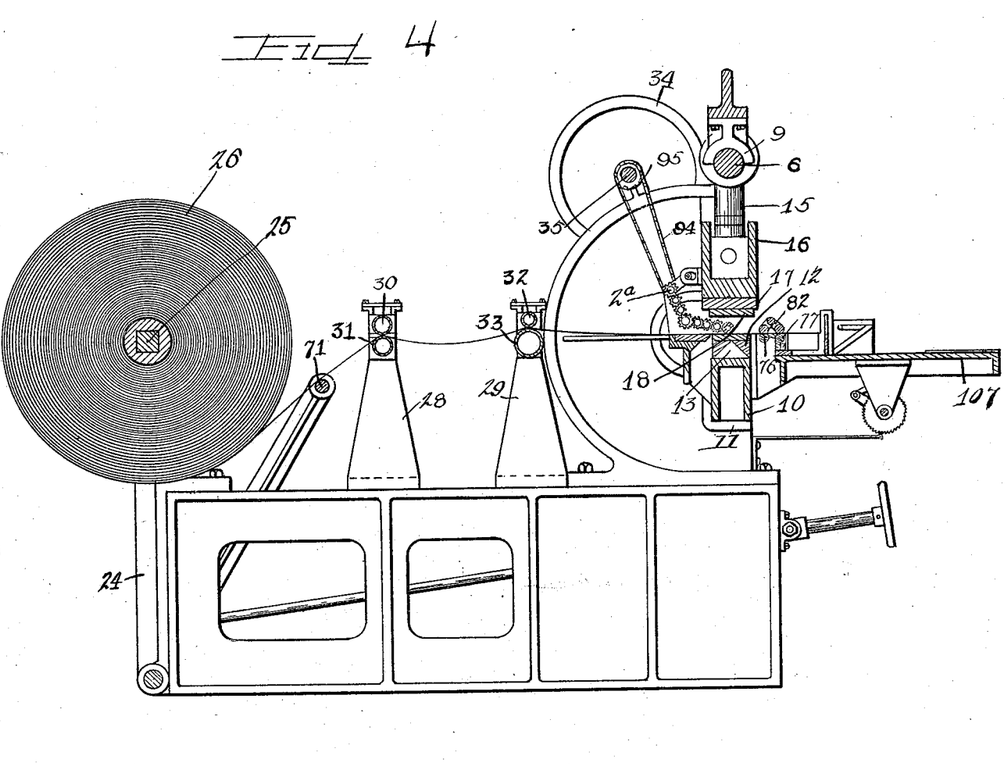
Fig. 4 is a section on line 4—4 of Fig. 1.
Figure 5:
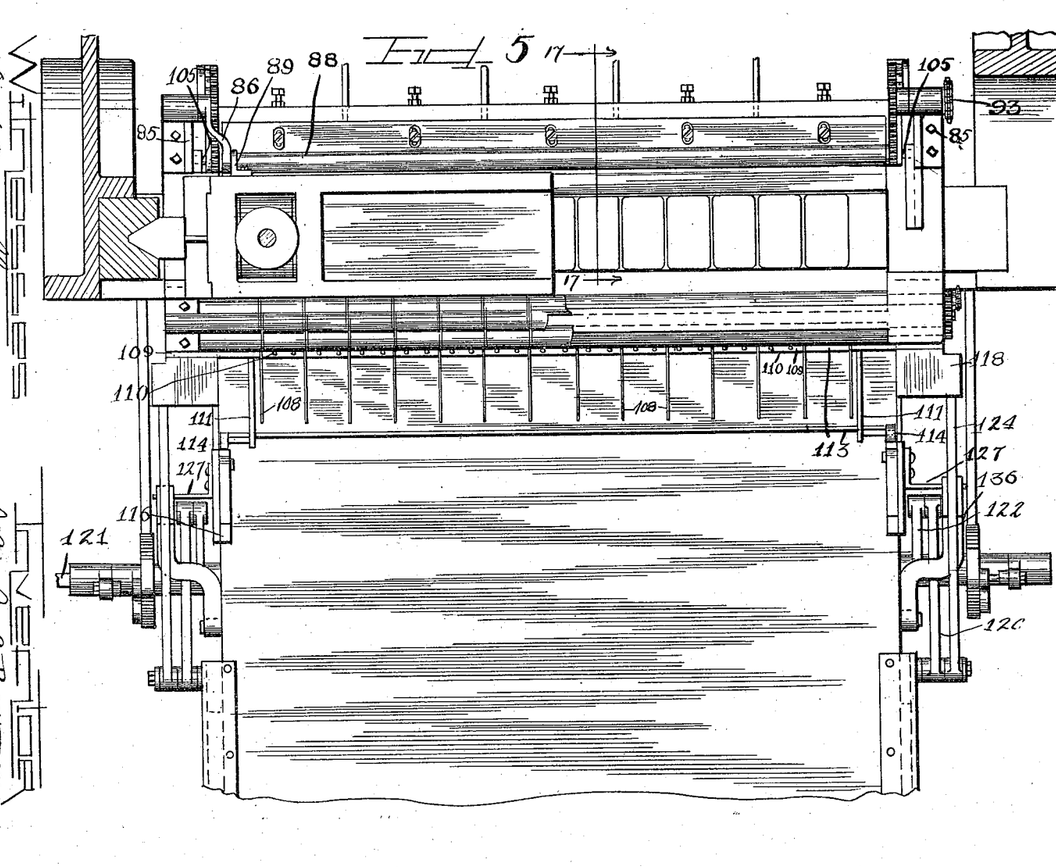
Fig. 5 is an enlarged section on line 5—5 of Fig. 1.

Mechanism is provided for advancing the cut cards from cutting position into engagement by the rollers 76 and 77. For this purpose, as shown, a bracket 85, is provided on each side of the machine at the rear of the die. Journaled on the inner side of each of said brackets is a bell crank, one arm 86, of which extends into close relation with the die head and is provided with an inwardly projecting stud 87, having journaled thereon a roller 88, which engages in a horizontal slot in a bracket 89, secured on the die head, as shown in Figs. 5, 6 and 7. The other end 90, of said bell crank is directed downwardly and pivotally engaged thereon is an arm 91, the free end of which projects toward the die head. Said bell crank on the driving side of the machine is fulcrumed on a rotative shaft $2^a$, having on its outer end a sprocket wheel 93, about which is trained a sprocket chain 94, shown in Fig. 4, trained about a sprocket wheel 95, secured on the driving shaft 35. Secured on the inner end of said shaft is a pinion 96, which meshes with pinions 97, 98 and 99, the latter of which is journaled upon the pivot bearing affording the connection between the arm 90, and the arm 91, and which meshes in turn with the pinion 100, of a train of pinions 100, 101, 102 and 103, journaled on the arm 91, the latter of which is at the extremity of said arm and is rigidly secured on a feed roller 104, journaled on a shaft 105, which extends transversely the machine and connects the extremities of the arms 91, as shown in Figs. 6, 7, 20 and 21. Said feed roller 104, is driven continuously by means of said train of gears in the direction to feed the cards from beneath the die head into engagement with the feed rollers 76 and 83, whereby the same are delivered to the packs, and, owing to the connection of the crank arm 86, with the die head, the bell crank is thereby reciprocated by the movements of the die head to withdraw the feed roller from beneath the dies, as shown in Fig. 6, as the die moves downwardly and to project the same beneath the die head with the feed roller 4, into engagement with the cut cards as the die head moves upwardly.

Figure 21:
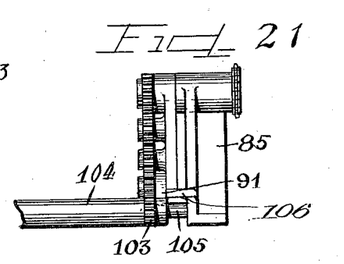
Fig. 21 is a front elevation of the card feed mechanism, with the feed roller broken away.

As shown in Figs. 5 and 21, the ends of the shaft 105, project beyond the arm 91, at each end of the shaft into position to engage an inclined guide 106, secured on each bracket, whereby with the retraction of the feed roller, as shown in Fig. 6, the feed roller is lifted and supported above the sheet during the cutting operation. During the retraction of the feed roller (which is driven at a high rate of speed) it may, if desired, assist in feeding the stock forwardly beneath the dies.

The severed cards are delivered from the feed rollers 76—83, and 77—84, in packs of a predetermined number. For this purpose, as shown, a table 107, is supported on the frame below said feed rolls 76—77, and supported above the same are separating or guide plates 108, affording a succession of compartments across the machine corresponding in number and in alinement with the cutting dies. Said guide plates act to direct or guide the cards from the feed rolls 77—84, into packs and are supported for their entire length above the table 107.

Extending across the table and normally directly beneath the feed roll 77, is a bar 109, having upwardly projecting fingers thereon 110, as shown two in each pack compartment, and which extend upwardly. These fingers are of a length to extend to near the plane of travel of the guards between the feed rollers.

Rigidly secured on the bar 109, near each end thereof, is a plate or bracket 111, which extends parallel the guide plates 108, and beyond the same and is provided at its outer end with a vertical slot 112, therein in which is secured a vertically slidable plate 113, which extends transversely the machine and affords the outer wall for each pack compartment. Said plate is of a width that when rested on the bed 107, its upper edge extends approximately to the top of the pack guide plates 108.

Secured at the outer extremity at each end of the plate near each side of the table 107, is a roller 114. Rigidly secured to, and projecting above each side of the table 107, is a plate or bracket 115, each of which is provided on its inner side with an outwardly and upwardly extending rib 116, as shown in Figs. 5, 6, and 7, positioned to engage the rollers 114, before described, to elevate the transverse stop plate 113, when the bar 109, and attached parts is drawn longitudinally of the table. As shown also, a bar 117, is pivotally engaged on each plate or bracket 115, at its inner end and at its outer end rests upon the rib 116. The free end of this bar is lifted to permit the rollers 114, to pass beneath the same on the rib 116, at the limit of travel in one direction and acts to support said rollers and the stop plate 113, during the return travel to normal, permitting said stop plate to fall back to position by gravity as the parts reach normal position. Mechanism is provided for affording this forward travel of the bar 109, (which may be termed the ejector bar) for the packs. For this purpose, as shown, a plate 118, is rigidly secured on each end of said bar and is provided on its under side with a hook 119, which is directed downwardly and rearwardly.

Figure 8:
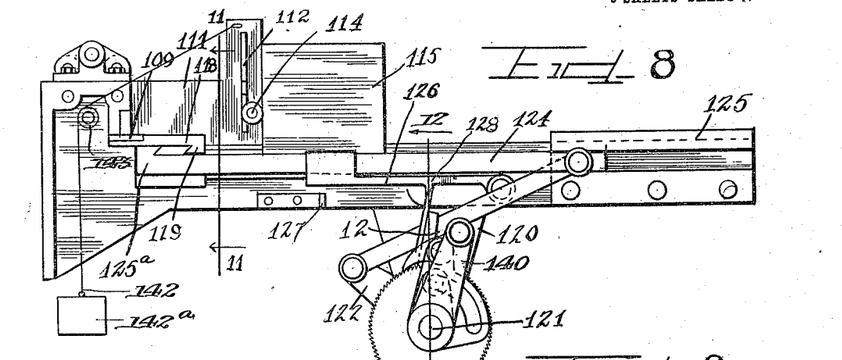
Figs. 8, 9, and 10 are enlarged side elevations of the counting mechanism, pack collecting mechanism and discharge table, showing the parts in different positions.
Figure 9:
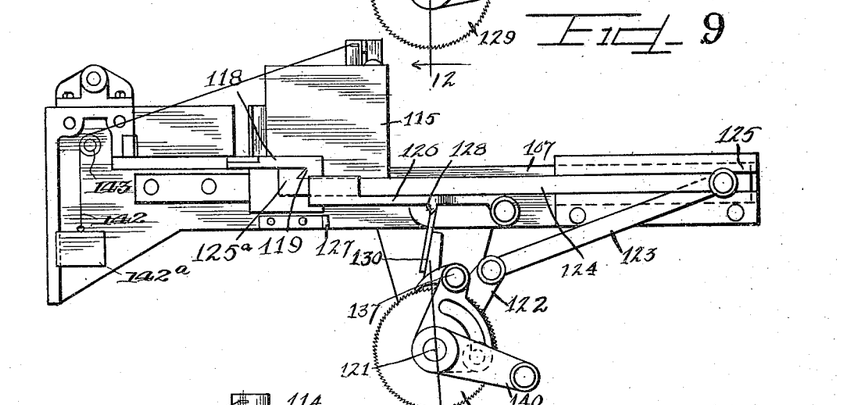
Figure 10:
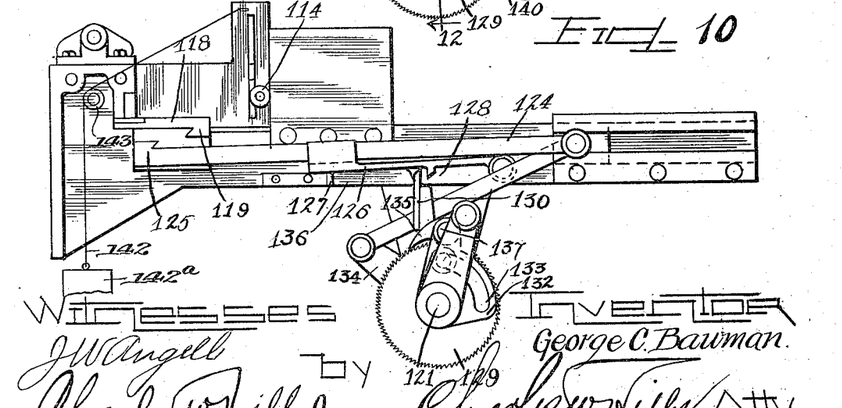

Journaled in brackets 120, depending from the table 107, is a shaft 121, rigidly secured on which is a crank arm 122, with the extremity of which is engaged a connecting rod 123, pivotally connected at its opposite extremity with a slide bar 124, on each side of the table 107. The pivot connection between the slide bar 124, and the connecting rod 123, is supported to slide between horizontal parallel guides 125, secured on each side of the table, as shown in Figs. 8, 9 and 10. Said slide bars 124, extend longitudinally the machine and beneath the plates 118, and are provided at their free extremities with upwardly directed hooks 125$^a$, complemental with the downwardly directed hooks 119, secured to the ejector bar. The free extremity of the slide bar is normally supported sufficiently below said hook 119, to hold said hooks normally out of engagement. For this purpose, as shown, levers 126, are pivotally supported on the side of the table, as shown in Figs. 5, 8 and 10, and extend beneath and support the respective slide bars. As shown, the free extremity of the lever 126, is normally supported on a bracket 127, as shown in Figs. 5 and 10. A downwardly directed projection having an inclined cam face on the under side thereof is secured centrally on the lever 126.

Rotatably secured on the shaft 121, is a ratchet wheel 129, having a number of teeth equal to the number of cars to be counted into each pack. Rigidly secured on said ratchet wheel is a tappet arm 130, which is of a length to engage the projection 128, on the lever 126, and elevate the same to bring the hook 125$^a$, into position to engage the hook 119, as shown in Figs. 8 and 9. As shown, such a ratchet wheel and tappet arm is provided on each end of the shaft 121, to raise the levers 126, simultaneously.

Rigidly secured on the shaft is a collar 131, and rotatably secured on the shaft between said collar and ratchet wheel 129, is a segment 132, having a slot 133, therein concentric with the shaft. A boss or projection integral with said segment extends beyond the periphery of the ratchet wheel and carried thereon is a spring pawl 135, which engages the teeth of the ratchet wheel. A bracket 136, is secured on each side of the table and projects laterally and downwardly therefrom and is provided on its inner side with a short slot into which projects the head 137, of the pintle for said pawl to limit the relative travel of the pawl to a distance equal to less than two teeth on the ratchet wheel. A pin 138, extends through the collar 131, and projects into the slot in the segment, as shown in dotted lines in Figs. 8, 9 and 10, and in elevation in Fig. 12.

Secured on the die shaft 6, and at the extremity thereof beyond the gear 37, is a crank 139, and secured on the corresponding extremity of the shaft 121, is a shorter crank 140. A connecting rod 141, is secured at its ends on said crank, so that the rotation of the die shaft serves to reciprocate the crank 140, and, of course, rock the shaft 121. The slot 133, in the segment is relatively short, the length being such that the oscillations of the shaft 121, oscillates the segment 132, by the pin 138, engaging successively in opposite ends of the slot, such oscillation being sufficient to rotate the ratchet wheel 129, one tooth with each rotation of the die shaft, that is to say, assuming the number of teeth on the ratchet wheel to be one hundred, one hundred rotations of the die shaft (each of which cuts one card) occasions a complete rotation of the ratchet wheel.

Inasmuch as the tappet arm is rigidly secured to the ratchet wheel, each rotation of the ratchet wheel brings the tappet arm back to normal position or into engagement with the lever 126, as shown in Figs. 8 and 9, lifting said lever and throwing the slide bars 124, upwardly, as shown in Fig. 8, so that the next reciprocation of the shaft acts to discharge the packs rearwardly immediately returning the parts to normal after the passage of said tappet arm from beneath the projection 128, on the lever 126.

As shown in Figs. 2, 8, 9 and 10, weights 142$^a$, are supported on lines 142, which are secured at one end on the brackets 111, and trained over suitable pulleys 143, one on each side the machine, which serve to return the ejecting bar and attached mechanisms to normal after the release of the slide bar 124.

The operation is as follows: The stock roll is supported on a shaft 25, as before described, with the outer end of the stock directed upwardly from the bottom of the roll between the continuously driven feed rollers 31—30, and thence directed between the feed rollers 33—32 and over the table and beneath the dies. The arms or levers 70, are thence adjusted relatively the stock roll by means of the hand wheel 75, so that the shaft 71, bends the stock inwardly as the same is drawn thereover by the continuous feed rools 31, this reverse bending, of course, acting to straighten the sheet for cutting.

The intermittently driven feed rolls 33—32 act to feed the stock forwardly beneath the die head immediately following the retraction of the dies and the forward movement of the feed roll 104. The amount of feed effected by the intermittent feed rollers 33—32, depends, of course, upon the requirements for the dimensions of the card to be cut. The feed is readily adjusted by shifting the connection of the connecting rod 67, to the slotted crank 60, as before described.

Just as the stock is fed beneath the die head, following the retraction of the feed roll 104, the dies are brought into engagement with the card, cutting the same and simultaneously severing the cut portion of the stock from the stock sheet to afford a straight and true forward edge on the stock sheet to feed forwardly over the male die members. The cutting of the card and trimming the stock sheet is effected simultaneously with the cutting of the selvage of the stock between the cards, which is effected by engaging the selvage between the face of the female die and the sharp cutting point 14, of the cutters intermediate the dies. The severed pieces, of course, fall freely from the machine.

With the upward movement of the die head, the bell crank lever 86—90, is reciprocated, projecting the arms 91, inwardly and simultaneously bringing the feed roll 104, into engagement with the cards on the male die member, the rapid rotation of said feed roll projecting the cards into engagement by the rollers 76—88, from which the rollers 77—84, engage the same, projecting them one by one into the pack compartment in alinement with each die. This operation is, of course, continued without intermission. With each rotation of the die shaft, as before described, the one hundred toothed ratchet wheel is rotated one notch, and with the dropping of the one hundredth card into the pack compartment, the hooked end of the slide bars are thrown upwardly by engagement of the tappet arm 120, beneath the projection 128, thereon, so that the next reciprocation of the crank 122, on the shaft 121, draws the ejector bar and packs rearwardly, throwing the stop plate 112, upwardly over the rib 116, of the brackets 115, and simultaneously with the release of the slide bars from engagement with the hooks of the ejector bar, which occurs with the opposite reciprocation of the crank 140, the weights on the cables 142, act to pull the ejector bar and attached parts back to normal in time to catch the next succeeding card.

All the cutters (such as the male and female die members and the bed knife 19) are readily removable from the machine for sharpening, and the bed knife, as shown, is adjustable toward or from the male die members by the set screws 145, which engage the same to shift the same relatively the male die members. Of course, the number of coacting dies must depend in part upon the width of the stock and the size of the cards to be cut. Inasmuch as the construction contemplates cutting the cards from stock rolls, it is obvious, however, that the stock may be made of any desired width, and consequently there may be any number of dies in alinement transversely the machine, thus enabling as many cards to be cut simultaneously as may be desired.

The machine operates at very high speed, and with the utmost precision, and the cards from each pair of dies are assembled into individual packs in the compartments appropriated for each die, and when ejected, as before described, are arranged in orderly arrangement across the table 107, in convenient position to be engaged by the packers who band the same and place the same in boxes for shipment.

Of course, I have described but a preferred embodiment of my invention. I therefore do not purpose limiting the patent to be issued on this application otherwise than necessitated by the prior art, as obviously numerous details of construction and operation may be varied without departing from the principles of this invention.

I claim as my invention:

1. A machine of the class described embracing cutters, coacting means rotatably supporting a roll of stock adjacent thereto, continuously acting feed mechanism for drawing the stock from the roll for delivery to the cutters, and rotating reciprocating means for ejecting the cut stock.

2. A machine of the class described embracing coacting cutters, means rotatably supporting a roll of stock adjacent thereto, continuously acting mechanism for drawing the stock from the roll, intermittently acting feed mechanism for delivering the stock to the cutters, ejecting means, and intermittently driven reciprocating mechanism to move the cut stock in stacks of certain number.

3. A machine of the class described embracing a frame, a roll of stock journaled thereon, a gang of cutters arranged transversely the frame in advance of the stock roll, mechanism feeding the stock from the roll to the cutters, a receiving table, reciprocating ejecting and stacking means, the latter adapted to move the stacks to said receiving table.

4. A machine of the class described embracing a frame, a roll of stock journaled thereon, a gang of cutters arranged transversely the frame, in advance of the stock roll, mechanism feeding the stock from the roll to the cutters, reciprocating means to eject the same therefrom, and a transverse bar adjustably supported adjacent the stock roll for straightening the stock thereover intermediate the stock roll and the cutters.

5. A machine of the class described embracing a frame, a roll of stock journaled thereon, a gang of cutters arranged transversely the frame, in advance of the stock roll, intermittently acting mechanism acting to feed the stock from the roll to the cutters, adjustable means for straightening the stock intermediate the stock roll and the cutters, and reciprocating conveying mechanism connected with the cutters for counting the cuts.

6. A machine of the class described embracing a frame, a gang of reciprocating cutters arranged transversely thereof, means intermittently feeding the stock thereto in a continuous strip, a positively driven rotating ejector acting to discharge the cut pieces from between the cutters, and means operated from the reciprocating element of the cutter to actuate said ejector simultaneously with the movement of said cutting element.

7. A machine of the class described embracing a frame, a gang of reciprocating cutters arranged transversely thereof, means feeding the stock thereto in a continuous strip, a rotative and reciprocating ejector roller acting to eject the cut pieces from between the cutters, and operative connections between the reciprocating element of the cutter and the ejector roller acting to advance and retract said roller simultaneously with the corresponding movements of said cutting elements.

8. A machine of the class described embracing a frame, a gang of reciprocating cutters arranged transversely thereof, means intermittently feeding the stock thereto in a continuous strip, a positively driven reciprocating roller acting to eject the cut pieces from between the cutters, and means operated from the reciprocating element of the cutter to advance and retract said feed roller simultaneously with the movement of said cutting element.

9. In a machine of the class described a frame, a transversely arranged gang of cutting elements at one end of the frame, one of which reciprocates, a roll of stock journaled at the other end of the frame, continuously acting feed rolls acting to draw the stock from the roll, intermittently acting feeding means positioned between the continuously acting feed rolls and the cutters and acting to advance the stock to the cutters, coacting cutters arranged transversely the machine to straighten the end of the stock simultaneously with the action of the gang of cutters, and means discharging the selvage from the cut stock downwardly from the cutters.

10. In a card cutting machine a frame, a transversely arranged gang of cutting elements at one end of the frame, means reciprocating one of the same, a roll of stock journaled at the other end of the frame, feed rolls acting continuously to draw the stock from the roll, intermittently acting feeding means positioned between the continuously acting feed rolls and the cutters and acting to advance the stock simultaneously with one of the movements of the cutters, coacting cutters arranged transversely the machine to straighten the end of the stock simultaneously with the action of the gang cutters, and means discharging the cut cards into packs.

11. In a card cutting, counting and packaging machine a frame, transversely arranged, coacting gangs of cutting elements at one end of the frame, means for reciprocating one of the same, means supporting the stock at the other end of the frame, continuously driven feed rolls acting to draw the stock into the machine, intermittently acting feeding means positioned between the continuously acting feed rolls and the gangs of cutters and acting to advance the stock with one of the movements of the reciprocating gang of cutters, coacting cutters arranged transversely the machine to straighten the end of the stock simultaneously with the action of the gang of cutters, means discharging cards as cut by the gangs into packs, and means discharging the packs when a predetermined number have been discharged thereto.

12. In a machine of the class described intermittently acting feeding means, a transversely arranged gang of card cutting dies, coöperating cutters acting to trim the uncut stock at the rear of the card cutting gang, and reciprocating conveying means counting the cut cards into packs.

13. A machine of the class described embracing feeding means for the stock, transversely arranged gangs of card cutting dies, means for actuating the same simultaneously with the feeding means, coöperative cutters acting simultaneously with said gang of card cutting dies to trim the stock adjacent the last cut preparatory to another cut, cutting means arranged between the individual card cutting dies to cut the selvage between the cards, and means ejecting cut cards into packs.

14. In a machine of the class described a gang of cutting dies embracing upwardly projecting stationary male die members, and reciprocating complemental female die members, cutters arranged between the respective dies, and transverse cutting means arranged at the rear of the gang and closely adjacent thereto to straighten the edge of the stock simultaneously with the operation of the gang of dies.

15. In a machine of the class described a gang of cutting dies embracing upwardly projecting stationary male die members, and reciprocating complemental female die members, cutters for the selvage arranged between the respective dies, transverse cutting means arranged at the rear of the gang and closely adjacent thereto to straighten the edge of the stock simultaneously with the operation of the gang of dies, reciprocating feed mechanism and means ejecting the cut cards from the dies.

16. In a machine of the class described a frame, a gang of transversely arranged dies embracing upwardly directed male die members and downwardly directed reciprocating female die members, intermittently acting feed mechanism for delivering the stock thereto, coacting transverse cutters acting to trim the end of the stock simultaneously with the operation of the gang of dies, means discharging the selvage of the stock from the machine, and positively driven reciprocating mechanism for ejecting the die cut pieces from between the dies into individual packs.

17. In a machine of the class described a frame, a gang of transversely arranged dies embracing upwardly directed male die members and downwardly directed female die members, means for reciprocating the female die members, intermittently acting feed mechanism for delivering the stock thereto, coacting transverse cutters acting to trim the end of the stock simultaneously with the operation of the gang of dies, means discharging the selvage of the stock from the machine, positively driven mechanism for ejecting the die cut pieces from between the dies into packs and means ejecting the packs when complete.

18. In a machine of the class described a gang of duplicate cutters arranged transversely the machine embracing complemental stationary and movable members, a transversely fixed stationary knife arranged at the rear of said cutters, a knife movable with the movable cutters to coact with said stationary knife to trim the stock, and intermittently acting means for feeding the stock forward preparatory to another cut.

19. A machine of the class described embracing stationary die members and reciprocating die members, a feed mechanism and a reciprocating rotating ejector operated with the reciprocating die members, and acting respectively to advance the stock and to eject the cut pieces from between the die members.

20. A machine of the class described embracing stationary die members and reciprocating die members, an ejector and a reciprocating conveying mechanism operated with the reciprocating die members, and acting respectively to eject the cut pieces from between the die members into packs and to move said packs away.

21. A machine of the class described embracing stationary die members and reciprocating die members, an ejector and a feed mechanism operated with the reciprocating die members, and acting respectively to eject the cut cards from between the die members, and to advance the stock, and reciprocatable means collecting the cut cards into packs.

22. In a machine of the class described mechanisms for simultaneously cutting a plurality of cards from a stock sheet, and trimming the sheet at the rear of the cut portion, means feeding the stock forward for another cut and a reciprocating continuously rotating feed roller acting to eject the cut cards from cutting position.

23. In a machine of the class described mechanisms for simultaneously cutting a plurality of cards from a stock sheet, and trimming the sheet at the rear of the cut portion, means feeding the stock forward for another cut, a reciprocating continuously rotating feed roller acting to eject the cut cards from cutting position, and means supporting the same out of action during the feeding of the stock.

24. In a machine of the class described mechanisms for simultaneously cutting a plurality of cards from a stock sheet, and trimming the sheet at the rear of the cut portion, means feeding the stock forward for another cut, a reciprocating continuously rotating feed roller acting to eject the cut cards from cutting position, means supporting the same out of action during the feeding of the stock and means collecting the ejected cards into packs.

25. In a machine of the class described a stationary die member and a coacting reciprocating die member, a bell crank operatively connected with the reciprocating die member to be oscillated thereby, an arm hingedly connected with one arm of the bell crank to be reciprocated thereby to a point between the dies, and a positively driven roller on said arm acting to eject the cut material from cutting position.

26. In a machine of the class described a stationary die member and a coacting reciprocating die member, a bell crank operatively connected with the reciprocating die member to be oscillated thereby, an arm hingedly connected with one arm of the bell crank to be reciprocated thereby to a point between the dies, an operatively driven roller journaled on said arm, and means acting to constantly rotate the same to eject the cut material from cutting position.

27. A machine of the class described embracing a stationary die and a reciprocating die, an arm operatively connected with the reciprocating die and reciprocated therefrom in a plane substantially at a right angle with the movement of the die member, and to a point between the die members, a roller thereon for ejecting the cut pieces from between the dies, and a positively driven train of gears for rotating said roller continuously.

28. A machine of the class described embracing a stationary die and a reciprocating die, an arm operatively connected with the reciprocating die and reciprocated therefrom in a plane substantially at a right angle with the movement of the die member, and to a point between the die members, a roller thereon engaging on the stationary die member and acting to eject the cut pieces from between the dies, and a positively driven train of gears for rotating said roller.

29. In a machine of the class described coacting die members and mechanism for reciprocating one of the same, and coacting trimming knives acting simultaneously with, and at the rear of said die members to trim the stock preparatory to the next succeeding cut.

30. A machine of the class described embracing one or more sets of coacting die members, means for feeding the stock to be cut therebetween to cutting position, mechanism operated by one of the die members for counting the pieces cut by the dies, means assembling the cut pieces into individual packs for each die, and reciprocatable means timed by the counting mechanism for ejecting the packs from collecting position.

31. A card cutting machine comprising a transverse gang of dies embracing stationary members and movable members, means for operating the dies, mechanism for feeding the stock thereto, transversely arranged collecting compartments in alinement with the respective pairs of dies, counting means operatively connected with the reciprocating die members to count the pieces cut by each die, means operated by the movable die member for delivering the cut pieces directly from the dies into packs, means ejecting the packs, and operative connections between the counting mechanisms and the ejecting means for actuating the latter.

32. In a machine of the class described a transversely arranged gang of card cutting dies embracing stationary members and coacting reciprocating members, a collecting compartment in alinement with, and appropriated to each pair of cutting die members, positively driven feed rolls between the same and the die members and reciprocating mechanism operated with the reciprocating die members to discharge the cut pieces from between the dies to said feed roll for delivery into said compartments simultaneously, counting mechanism operatively driven with the reciprocating die members, and mechanism operatively connected with the counting means for simultaneously ejecting all the packs from the collecting compartments at the end of a predetermined count by said counting mechanism.

33. In a machine of the class described the combination with the rotatably supported roll of stock paper, the cutting mechanisms, and feeding means for delivering the stock to the cutting mechanisms, of constantly rotating reciprocating means for ejecting the stock from the cutting mechanism.

34. In a device of the class described a reciprocating gang die, a bell crank actuated thereby, a link pivoted to said crank and adapted to be projected beneath said die as the same moves upwardly, rotating means thereon to eject the stock from the dies, and means elevating said link above the stock as said link is retracted.

35. In a machine of the class described a reciprocating die, a bell crank pivoted adjacent thereto, a slotted lug on said die engaging one end of said crank, a link pivoted to said crank and adapted to be projected and retracted relative to the die, a rotating roller thereon and guides adapted to engage the ends thereof to elevate said link as it is retracted.

36. A machine of the class described embracing a rotatably supported stock roll and cutting mechanism, continuously driven feed rolls for unwinding the stock from the roll, intermittently acting feed rolls for delivering the stock from the continuous feed rolls to the cutting mechanism, and a constantly driven reciprocatable roll for ejecting the cut stock.

37. A machine of the class described embracing a rotatably supported stock roll and cutting mechanism, of continuously driven feed rolls for unwinding the stock from the roll, intermittently acting feed rolls for delivering the stock from the continuous feed rolls to the cutting mechanism, straightening means positioned between the stock roll and the continuously acting feed rolls, links adapted to be reciprocated and a constantly rotating element on one of said links to eject the stock from beneath the cutting mechanism.

38. A machine of the class described embracing a rotatably supported stock roll and cutting mechanism, of continuously driven feed rolls for unwinding the stock from the roll, intermittently acting feed rolls for delivering the stock from the continuous feed rolls to the cutting mechanism, and reciprocatable conveying and stacking means for the cut stock.

39. In a machine of the class described, dies for cutting the stock into cards, a receiving compartment for the cards to stack the same, a reciprocatable bar, fingers thereon to engage the rear of said stacks and means acting to move said bar to transfer said stacks to a disposing position when a certain number of cards have been stacked.

40. In a machine of the class described dies for cutting the stock into cards, receiving compartments therefor comprising a plurality of parallel walls, fingers reciprocatably mounted affording a rear wall, and a front wall adapted to be moved upwardly allowing said fingers to thrust a stack of cards out of said compartment when a certain number have been stacked.

41. In a machine of the class described compartments to receive the cards in stacks, a movable wall adapted to be elevated and fingers affording the rear wall of said compartments adapted to move the card stacks out of said compartments beneath said wall.

42. In a machine of the class described reciprocating dies, a shaft for operating the same, compartments to receive the cards from the dies, operating means connected to said shaft and said compartment elements, one of said elements adapted to be moved forwardly to thrust the stack from said compartment and another element adapted to be elevated to permit the passage of said stack therebeneath.

In testimony whereof I have hereunto subscribed my name in the presence of two subscribing witnesses.

GEORGE C. BAUMAN.

Witnesses:
LAWRENCE REIBSTEIN,
CHARLES W. HILLS, Jr.

Copies of this patent may be obtained for five cents each, by addressing the "Commissioner of Patents, Washington, D. C."